March 20, 1962

E. C. GUPTILL 3,026,477

ELECTRICAL MEASURING INSTRUMENT

Filed Jan. 19, 1960

INVENTOR.
EDWIN C. GUPTILL
BY
Irving M. Freedman
HIS ATTORNEY

United States Patent Office 3,026,477
Patented Mar. 20, 1962

3,026,477
ELECTRICAL MEASURING INSTRUMENT
Edwin C. Guptill, Peabody, Mass., assignor to General
Electric Company, a corporation of New York
Filed Jan. 19, 1960, Ser. No. 3,332
5 Claims. (Cl. 324—147)

This invention relates to moving iron electrical measuring instruments and in particular to the concentric-vane type of moving iron instrument. Electrical measuring instruments of the moving iron type generally comprise a current conducting coil winding inductively related to a pair of relatively movable magnetic vanes. Current flow in the coil provides a deflecting force between the relatively movable magnetic vanes due to their proximity and magnetization in a manner well known in the art. In the concentric-vane type of moving iron instrument, the vanes are curved about the instrument shaft with the moving vane deflecting concentrically within the stationary vane. The principal disadvantages of the concentric-vane moving iron instrument as compared to the radial vane instrument, in which the vanes lie along the radii of a circle whose center is the instrument shaft, are the requirement of more operating power and the inherent difficulty of obtaining uniform scale distribution characteristics.

The driving torque of a concentric-vane instrument is defined by the equation:

(1) $$T_d = KI^2 dL/d\alpha$$

where:

$T$ = driving torque
$I$ = coil current
$L$ = coil inductance
$\alpha$ = angle of deflection of the moving system Since uniform rather than square-law distributions are preferred, it is evident that assuming a constant spring constant the rate of change of inductance with respect to angle must decrease as the current increases, and ideally:

(2) $$L = K \frac{\log \alpha}{\alpha_0}$$

where:

$\alpha_0$ = the zero current or reference position of the moving system.

A multitude of prior art arrangements have been proposed and used in which the various magnetic members of the instrument are especially shaped and/or fabricated in order to provide a linear instrument deflection characteristic versus current input. For the most part, such arrangements have proved to be either impractical, difficult or expensive to manufacture or adjust, or to require close manufacturing tolerances.

It is an object of this invention to provide an improved concentric-vane moving iron instrument having a linear deflection versus electrical input characteristic.

It is another object of this invention to provide an improved concentric-vane moving iron instrument in which increased driving torque is developed while at the same time the weight and inertia of the moving system is minimized.

It is still another object of this invention to provide an improved readily manufactured concentric-vane type of moving iron instrument exhibiting high sensitivity and predictable linear deflection characteristics which is suitable for use with a preprinted scale.

Further objects and advantages of the invention will become apparent as the following description proceeds and features of novelty which characterize the invention will be pointed out with particularity in the claims annexed to and forming a part of this specification.

In accordance with one embodiment of the invention, a concentric-vane type of repulsion instrument is provided which includes a field coil and a pair of relatively movable concentric vanes. The movable vane is formed from magnetizable sheet material having a substantially rhombus shape and is mounted for rotation such that the vane tapers from a maximum dimension in a plane perpendicular to the axis of rotation of the vane to a minimum dimension at the flatted ends remote from the plane. The stationary vane is formed from magnetizable sheet material which includes a rectangular portion corresponding with the initial deflection range of the movable vane and a tapered portion extending over the remainder of the deflection range. The tapered portion decreases from a maximum axial dimension adjacent the rectangular portion to a minimum axial dimension corresponding with the full scale region thereof and with the maximum axial dimension of the tapered portion being less than the axial dimension of the rectangular portion.

For a better understanding of this invention reference may be had to the following description taken in connection with the accompanying drawings in which.

Figure 1:
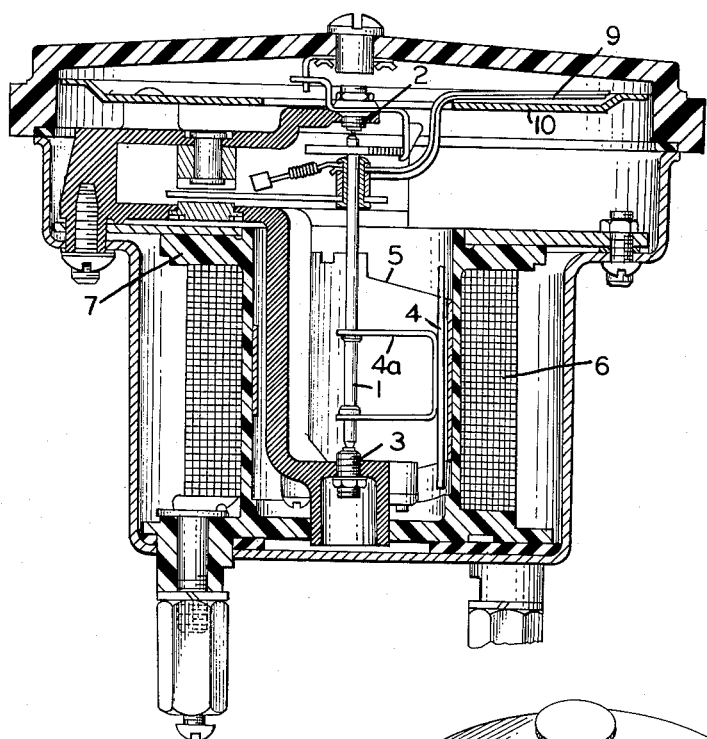
FIG. 1 is a cross-sectional view of an instrument embodying the invention.

Referring to the figures, it will be seen that the electrical instrument in which the invention is shown may be of the general type disclosed in the copending application of Carl F. Van Bennekom and Edward V. A. DeLamoreaux, entitled "Electric Measuring Instrument," Ser. No. 850,430, filed November 2, 1959, and assigned to the same assignee as the subject application. Reference may be had to that application for a more complete description of the general construction details and operation of the concentric-vane moving iron instrument.

Briefly, however, shaft 1 is rotatably mounted and supported at the ends thereof by jewel bearings indicated generally as 2 and 3. The shaft 1 supports a movable iron or vane 4 through arm 4a for rotation therewith within the region defined by the stationary vane 5. The movable vane 4 and stationary vane 5 are formed of magnetizable sheet material and are concentric to each other about the shaft 1 with arm 4a positioning the movable vane proximate to the stationary vane. The current or field coil 6 surrounds the stationary vane 5. The control spring 8 positions the pointer 9 attached to the shaft 1 relative to the scale 10 so that the pointer indicates zero when the current flow through the field coil 6 is zero. Current flow through the field coil 6 inductively magnetizes vanes 4 and 5 such that the movable vane deflects an amount proportional to the magnitude of the current flow in a manner well known in the art.

The above-referenced patent application describes means to insure accurate and concentric positioning of the magnetic parts of the instrument. The stationary vane 5 and the movable vane 4 described below have been found to provide optimum torque, sensitivity and linear deflection characteristics.

Figure 3:
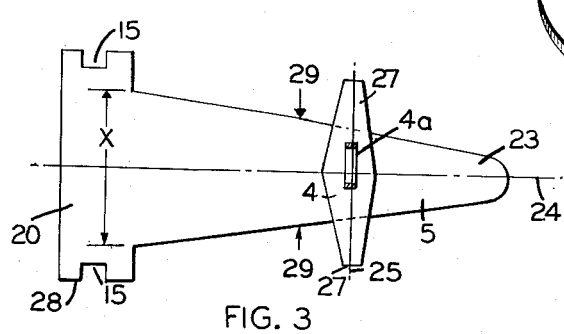

The stationary vane 5, as best illustrated by the surface development of FIG. 3, comprises a substantially rectangular initial portion 20 which is located in the region of the low current or initial deflection range of the instrument. This portion of the stationary vane provide a maximum $$\frac{dL}{d\alpha}$$

that is, a maximum change of inductance per change of angle of deflection of the moving system. In accordance with the relationship set forth in Equation (1) this provides a large initial torque to overcome inertia effects and enhance the sensitivity of the instrument. Rectangular slots 15 are utilized to secure the stationary iron to the inside of the field coil 6 in a manner more fully described below.

The remainder of the stationary vane 5 (alongside which the movable vane 4 passes during upscale deflections) tapers from a maximum axial dimension "X" adjacent the rectangular portion 20 to a rounded end portion or apex 23 in the region of the full scale deflection position of the movable vane. The slope of the taper beyond intermediate points 29 may be increased to further tailor the deflection characteristics of the instrument. The dimension "X" is less than the axial dimension of the rectangular portion 20 and the axial length of the movable vane. It will be seen that the stationary vane 5 is substantially symmetrical about a center line or plane 24 transverse to the axis of rotation of the movable vane 4.

The movable vane 4 comprises a substantially rhombus-shaped sheet of magnetizable material substantially symmetrical about both the center line or plane 24 and a radial plane 25 passing through the axis of rotation of the moving system. The movable vane 4 is substantially rhombus shaped and includes linear peripheral portions which taper in the axial direction from a maximum width along plane 24 to a minimum width at the flatted apexes or ends 27 which are parallel to and spaced from the plane 24. The arm 4a which supports the movable vane is connected to the vane along the plane 25 at distances equidistant from plane 24. The described configuration insures minimum weight and inertia of the moving system, minimizes wear on the bearings 2 and 3 due to unbalance torques, and at the same time provides sufficient torque for optimum sensitivity of the instrument.

Figure 2:
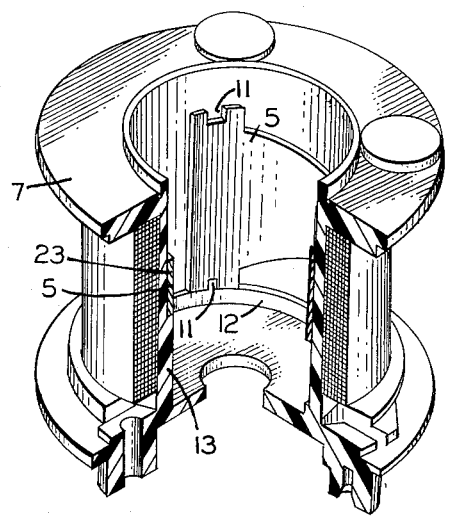
FIG. 2 is a cutaway perspective view of the instrument shown in FIG. 1 illustrating the mounting details of the stationary vane; and, FIG. 3 is a diagram showing a development of the surfaces of the stationary and movable irons used in the instrument shown in FIG. 1.

The stationary vane 5 is secured about the interior of the spool 7, as best shown in FIG. 2. Referring to FIG. 2, the stationary vane 5 is positioned angularly through the co-operation of slots 15 with mating keys 11 which may be formed integrally with spool 20. The bottom edge 28 of the rectangular portion 20 of movable vane 4 rests upon the rim 12 of spool 7 while the end portion 23 co-operates with the ridge 13 extending upward from the rim 12 in the region of the end portion. By forming the stationary vane 5 with a radius of curvature slightly greater than that of the interior of the spool 7, the stationary vane expands upon insertion to fit snugly against the interior of the spool to be concentric to the field coil 6 wound upon the outside of the spool.

In a long scale instrument the following surface development dimensions of the vanes 4 and 5 were found to be desirable in practicing the invention. The rectangular portion 20 of the stationary vane 5 extends 1.400" in the axial direction and 0.75" across the ends in which centrally located notches 15 having dimensions 0.10" wide by 0.135" deep, are cut. The length of the stationary vane 5 along axis 24 is 3.500" to the center of the rounded end 23 and 3.140" to a line passing through points 29. The periphery of rounded end 23 has a radius of 0.156".

The movable vane 4 is 1.375" long in the axial dimension and tapers from a maximum dimension of 0.312" along the center line or plane 24 to 0.08" along the ends 27. The vane is curved so as to lie along a portion of a right cylinder having a radius of 0.610".

In the zero current position, the center plane 27 of the movable vane 4 is approximately aligned with the junction between the rectangular portion 20 of the stationary vane 5 and the tapered portion thereof.

It has been found that fabrication of the movable vane 4 and the stationary vane 5 as described above may be accomplished with readily obtainable manufacturing tolerances and provides an instrument having optimum linear deflection characteristics, improved sensitivity and reduced inertia of the moving system without the use of auxiliary magnetic members.

Therefore, while a particular embodiment of the subject invention has been shown and described herein it is in the nature of description rather than limitation and it will occur to those skilled in the art that various changes, modifications and combinations may be made within the provisions of the appended claims without departing either in spirit or scope from this invention in its broader aspects.

What I claim as new and desire to secure by Letters Patent of the United States is:

1. For use in a long scale concentric vane repulsion type of electric instrument, a field coil, a rotatably mounted movable vane formed from a substantially rhombus-shaped magnetizable sheet and mounted so as to taper from a maximum dimension in a plane perpendicular to the axis of rotation of the vane to a minimum dimension at the ends remote from said plane, said movable vane deflectable over a predetermined range in accordance with current flow through said coil, and a stationary vane in inductive relationship with said movable vane and said coil, said vanes being arranged concentrically about said axis of rotation, said stationary vane formed from magnetizable sheet material and including a first portion which extends substantially uniformly in the axial direction, and a tapered portion of said stationary vane which decreases from a maximum axial dimension adjacent said first portion in the region of the minimum current position to a minimum axial dimension in the region of the maximum current position of said movable vane, said movable and stationary vanes extending in an axial direction substantially symmetrical about said plane.

2. For use in a long scale concentric vane repulsion type of electric instrument, a field coil, a rotatably mounted movable vane formed from a substantially rhombus-shaped magnetizable sheet and mounted so as to taper from a maximum dimension in a plane perpendicular to the axis of rotation of the vane to a minimum dimension at the ends remote from said plane, said movable vane deflectable over a predetermined range in accordance with current flow through said coil, and a stationary vane in inductive relationship with said movable vane and said coil, said vanes being arranged concentrically about said axis of rotation, said stationary vane formed from magnetizable sheet material and including a first portion which extends substantially uniformly in the axial direction, and a tapered portion of said stationary vane which decreases from a maximum axial dimension adjacent said first portion in the region of the minimum current position to a minimum axial dimension in the region of the maximum current position of said movable vane, said maximum dimension being less than the uniform axial length of said initial portion, said movable and stationary vanes extending in an axial direction substantially symmetrical about said plane.

3. For use in a long scale concentric vane repulsion type of electric instrument, a field coil, a rotatably mounted movable vane formed from a substantially rhombus-shaped magnetizable sheet and mounted so as to taper from a maximum dimension in a plane perpendicular to the axis of rotation of the vane to a minimum dimension at the flatted ends remote from said plane, said movable vane deflectable over a predetermined range in accordance with current flow through said coil, and a stationary vane in inductive relationship with said movable vane and said coil, said vanes being arranged concentrically about said axis, said stationary vane formed from magnetizable sheet material and including a first rectangular portion which extends substantially uniformly in the axial direction, and a tapered portion of said stationary vane which decreases from a maximum axial dimension adjacent said first portion in the region of the minimum current position to a minimum axial dimension in the region of the maximum current position of said movable vane, said maximum dimension being less than the uniform axial length of said initial portion, said movable and stationary vanes extending in an axial direction substantially symmetrical about said plane and said movable vane being supported about the center of mass thereof.

4. For use in a long scale concentric vane repulsion type of electric instrument, a field coil, a rotatably mounted movable vane deflectable over a predetermined range in accordance with current flow through said coil, and a stationary vane in inductive relationship with said movable vane and said coil, said stationary vane positioned concentrically about said movable vane and formed from a magnetizable sheet including a first rectangular portion in the region of the minimum current position of said movable vane, and a tapered portion of said stationary vane which decreases from a maximum axial dimension adjacent said first portion to a minimum axial dimension in the region of the maximum current position of said movable vane, said maximum dimension being less than the uniform axial length of said initial portion, to provide an abrupt discontinuity in the axial length of said stationary vane, said vanes being concentric about the axis of rotation of the movable vane and positioned in the zero current position with the movable vane disposed substantially symmetrical about a line contiguous to and aligned with said axial abrupt discontinuity.

5. For use in a long scale concentric vane repulsion type of electric instrument, a field coil wound upon a tubular spool, a rotatably mounted movable vane deflectable over a predetermined range in accordance with current flow through said coil, and a stationary vane in inductive relationship with said movable vane and said coil, said stationary vane formed concentrically about said movable vane from a magnetizable sheet including a first rectangular portion in the region of the minimum current position of said movable vane, and a tapered portion of said stationary vane which decreases from a maximum axial dimension adjacent said first portion to a minimum axial dimension in the region of the maximum current position of said movable vane, said maximum dimension being less than the uniform axial length of said initial portion to provide an abrupt discontinuity in the axial length of said stationary vane, and notches in said rectangular portion adapted to be engaged by projections of said spool for positioning the stationary vane within said spool, said vanes being concentric about the axis of rotation of the movable vane and positioned in the zero current position with the movable vane disposed substantially symmetrical about a line contiguous to and aligned with said axial abrupt discontinuity.

References Cited in the file of this patent

UNITED STATES PATENTS

| | | |
|---|---|---|
| 646,110 | Spies | Mar. 27, 1900 |
| 2,183,685 | Lingg | Dec. 19, 1939 |
| 2,536,526 | Andersson | Jan. 2, 1951 |
| 2,610,989 | Wiese | Sept. 16, 1952 |

FOREIGN PATENTS

| | | |
|---|---|---|
| 288,665 | France | May 9, 1899 |